US012675807B2

(12) United States Patent

Jones

(10) Patent No.: US 12,675,807 B2
(45) Date of Patent: Jul. 7, 2026

(54) SYSTEM FOR EVENT-DRIVEN DELIVERY OF DIGITAL OFFERS TO CUSTOMERS WHILE INSIDE A CAR WASH

(71) Applicant: Jeffrey Stewart Jones, Suwanee, GA (US)

(72) Inventor: Jeffrey Stewart Jones, Suwanee, GA (US)

( * ) Notice: Subject to any disclaimer, the term of this patent is extended or adjusted under 35 U.S.C. 154(b) by 0 days.

(21) Appl. No.: 19/203,669

(22) Filed: May 9, 2025

(65) Prior Publication Data

US 2025/0348904 A1 Nov. 13, 2025

Related U.S. Application Data

(60) Provisional application No. 63/644,651, filed on May 9, 2024.

(51) Int. Cl.
| | |
|---|---|
| *G06Q 30/02* | (2023.01) |
| *B60S 3/04* | (2006.01) |
| *G06Q 20/20* | (2012.01) |
| *G06Q 30/0251* | (2023.01) |
| *G06K 7/14* | (2006.01) |

(52) U.S. Cl.
CPC ............ *G06Q 30/0265* (2013.01); *B60S 3/04* (2013.01); *G06Q 20/20* (2013.01); *G06K 7/1417* (2013.01)

(58) Field of Classification Search
CPC .. G06Q 30/0265; G06Q 20/20; G06Q 20/308; G06Q 20/3276; B60S 3/04; G06K 7/1417; G07F 17/20
See application file for complete search history.

(56) References Cited

U.S. PATENT DOCUMENTS

| | | | | |
|---|---|---|---|---|
| 9,323,137 | B1 * | 4/2016 | Secord | G03B 21/001 |
| 12,145,546 | B1 * | 11/2024 | Walker | B60S 3/063 |
| 2012/0253973 | A1 * | 10/2012 | Harter | G06Q 20/3224 |
| | | | | 455/456.3 |
| 2014/0224279 | A1 * | 8/2014 | Anderson | B60S 3/063 |
| | | | | 134/18 |
| 2016/0300047 | A1 * | 10/2016 | Tapscott | G07F 9/002 |
| 2017/0357996 | A1 * | 12/2017 | Jones | G06Q 20/20 |
| 2019/0295135 | A1 * | 9/2019 | Jones | G06Q 30/0281 |
| 2022/0012975 | A1 * | 1/2022 | Shturma | G06Q 20/3276 |

OTHER PUBLICATIONS

"Car Wash Forum" (https://www.carwashforum.com/threads/phone-apps.18395/—Online car wash community forum with plurality of user submissions between Jun. 17, 2020 and Aug. 17, 2020) (Year: 2020).*

* cited by examiner

*Primary Examiner* — James M Detweiler
(74) *Attorney, Agent, or Firm* — Dunlap Bennett & Ludwig PLLC

(57) ABSTRACT

A method for engaging to a computing device of a user of a car wash having a plurality of wash operations is disclosed. The method links the computer device to a processor at a point-of-sale terminal. Upon receiving, via the processor, an input signal from the user, wherein the input signal includes a subset of wash operations of the plurality of wash operations, for each wash operation of the subset of wash operations, the processor determines an associated digital offer element. The method also provides for the sequentially receiving an indication of activation of each wash operation of the subset of wash operations and upon receiving the indication of activation of each wash operation, transmitting in real time via the processor the associated digital offer element to the computing device.

7 Claims, 2 Drawing Sheets

SYSTEM FOR EVENT-DRIVEN DELIVERY OF DIGITAL OFFERS TO CUSTOMERS WHILE INSIDE A CAR WASH

CROSS REFERENCE TO RELATED APPLICATION

This application claims the benefit of priority of U.S. provisional application No. 63/644,651, filed 9 May 2024, the contents of which are herein incorporated by reference.

BACKGROUND OF THE SUBJ ECT DISCLOSURE

The subject disclosure relates to car wash facilities and, more particularly, to a system for event-driven delivery of digital offers to customers while inside a car wash facility.

There is currently no ability to responsively send offers directly to a carwash customer's smart device during the in-wash experience at a car wash facility, thereby significantly limiting the potential direct customer engagement experience to about 30 seconds (i.e., the time it takes for the customer to pay for the car wash at the point of sale) versus utilizing the complete, captive in-wash experience to directly engage with the customer.

The customer is only at the pay station for a moment and once payment is made, there is very limited opportunity for direct marketing (e.g., presenting them with offers to enhance their experience and build brand loyalty). In addition, a significant number of customers enter the carwash anonymously as non-members (i.e., a user with no prior contact information in the system). Anonymity makes it more challenging to convert the user to members, build brand loyalty, and inform them of additional offers during the wash or after they leave the wash site.

In the field of consumer behavior, an impulse purchase or impulse buying is an unplanned decision by a consumer to buy a product or service, made just before a initially planned purchase. Well-crafted promotional messages and the buying environment can trigger impulse buying. In a study done by Mattila and Wirtz in 2008, they found that when a consumer perceives that their environment is overstimulating, they are more likely to make an impulse purchase.

The inventor has discovered the highly stimulating components (or "events") one experiences during an in-vehicle car wash—e.g., pre-wash spraying, foam applicators, high-pressure water blasters, wraps and brushes, LED lights and the like—create an immersive experience wherein if the captive audience is delivered promotional messages synchronous in time and content with these events, the proprietors of the car wash can profit immediately and in the long term through brand loyalty.

Furthermore, if these offers are not presented directly to the customer's smart device, they are much harder for the recipient/customer to manage (and be retained for future visits) once they leave the wash site, which in turn suppresses potential redemption rates.

The current approach of limiting offers and marketing to the point of sale significantly sub-optimizes the direct customer engagement opportunity, which impacts the ability to sell/market to the carwash customers (e.g., convert non-members to members, up-sell, cross-sell, increase loyalty, drive return visits, etc.).

Current systems have only one primary interaction or engagement point with customers, (e.g., pay station) versus multiple points of engagement. With only having one primary direct engagement point with an anonymous customer, once that customer passes that point of sale, the wash site owner must wait until they return (if they return) to the site to directly interact/sell to them again if the owner do not have that anonymous customer's contact information. This is especially true with unattended wash formats.

As can be seen, there is a need for a system for event-driven delivery of digital offers to in-vehicle customers immersed in a car wash, thereby allowing operators of the car wash to target and synchronously market to anonymous customers during the wash and after versus just at the point of sale. Thus, giving the owner-operator more time and more ways to induce purchases and convert customers to new services (e.g., memberships, higher value washes, etc.) and product offerings (e.g., convenience store items, cross-marketing deals, etc.) by expanding from the single engagement point of the point of sale to multiple engagement points incorporating each in-vehicle wash event.

SUMMARY OF THE SUBJ ECT DISCLOSURE

The system of the subject disclosure allows for a cost-effective method for enabling multiple engagement points throughout the entire wash experience and beyond via the customer's mobile device, versus a single intersection point at the pay station.

The subject disclosure distributes a plurality of interactive digital assets (e.g., coupons, ads, text messaging, etc.) as well as custom digital file images (e.g., PDF, JPEG, etc.).

The subject disclosure allows carwash owner-operators to cost-effectively target a customer with digital offers delivered to mobile device of the customer during or after their in-vehicle wash experience with the use of a scanned quick-response code (QRC) or other forms of multidimensional matrix barcode or other computer readable instructions linking to the customer's mobile device at the point of sale (POS) without the customer having to download an app prior or be part of a membership program. When the QRC is scanned by the customer's mobile device, this links the customer's mobile device to a cloud-based platform having stored digital offers that can be delivered directly to customers mobile device at any engagement point during or selectively after the carwash through text message, direct display on their mobile device, and the like. Digital assets may include but are not limited to audio and video effect files (e.g., mp3, mp4, wav, m4a, ogg, flac, etc.), still image files (e.g., pdf, jpeg, png, bmp, gif, etc.) and hyperlinks, used in the creation of customer digital offers. The system enables the customer to store these offers on their mobile device for later reference and redemption.

Additionally, with the capture of the customer's mobile number and other interactional data, marketing can occur to the now-known customer at a later, post-wash time. Interactional data may include, but is not limited to, QR Code scan rate, contact capture rate, message click-through rate. Thus, increasing the opportunity time frame for customer engagement and furthering the marketing objectives of the car wash.

In one aspect of the present subject disclosure, a computer-implemented method for engaging to a computing device of a user of a car wash having a plurality of wash operations includes the following: linking the computer device to a processor; receiving, via the processor, an input signal from the user, the input signal comprising a subset of wash operations of the plurality of wash operations; for each wash operation of the subset of wash operations, determining an associated digital offer element via the processor; sequentially receiving an indication of activation of each wash operation of the subset of wash operations; and upon receiving the indication of activation of each wash operation, transmitting in real time via the processor the associated digital offer element to the computing device.

In another aspect of the present subject disclosure, the computer-implemented method for engaging to a computing device of a user of a car wash having a plurality of wash operations further includes the following: a wherein the plurality of wash operations includes a pre-wash spraying device, a foam applicator device, a high-pressure water blaster device, wherein each of the plurality of wash operations comprises a sensor for determining the indication of activation, wherein a point-of-sale terminal is configured for (a) linking the computer device to the processor; and (b) receiving the input signal from the user, wherein linking the computer device contemplates the user scanning a QRC at the point-of-sale terminal, wherein the car wash is an in-vehicle car wash, wherein the in-vehicle car wash is unattended, and wherein the point-of-sale terminal is physically separated from each wash operation of the plurality of wash operations.

In yet another aspect of the present subject disclosure, a system for engaging to a computing device of a user of a car wash having a plurality of wash operations provides the following: a processor in communication with a point-of-sale terminal; a QRC provided by the point-of-sale terminal, the QRC configured to receive an input signal from the user, the input signal comprising a subset of wash operations of the plurality of wash operations; a format decision making module configured to determine, for each wash operation of the subset of wash operations, an associated digital offer element via the processor; and a distribution module configured to sequentially receive an indication of activation of each wash operation of the subset of wash operations; and upon receiving the indication of activation of each wash operation, transmitting in real time via the processor the associated digital offer element to the computing device.

These and other features, aspects and advantages of the present subject disclosure will become better understood with reference to the following drawings, description and claims.

DETAILED DESCRIPTION OF THE SUBJECT DISCLOSURE

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

Broadly, an embodiment of the present subject disclosure provides a system for event-driven delivery of digital offers to customers while inside an in-vehicle car wash facility, be it attended or unattended.

Figure 1:
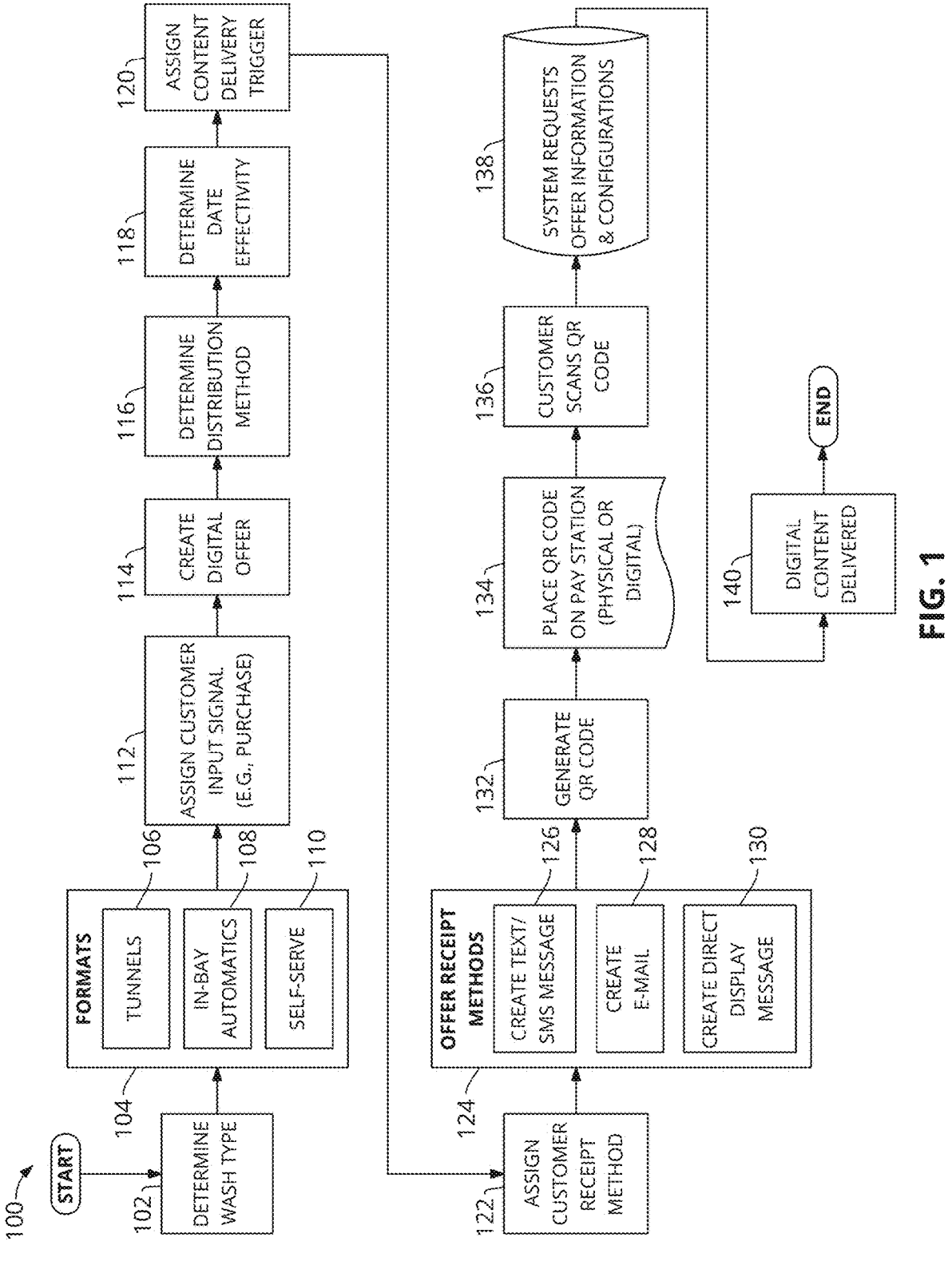
FIG. 1 is a flow chart of an exemplary embodiment of the subject disclosure.
Figure 2:
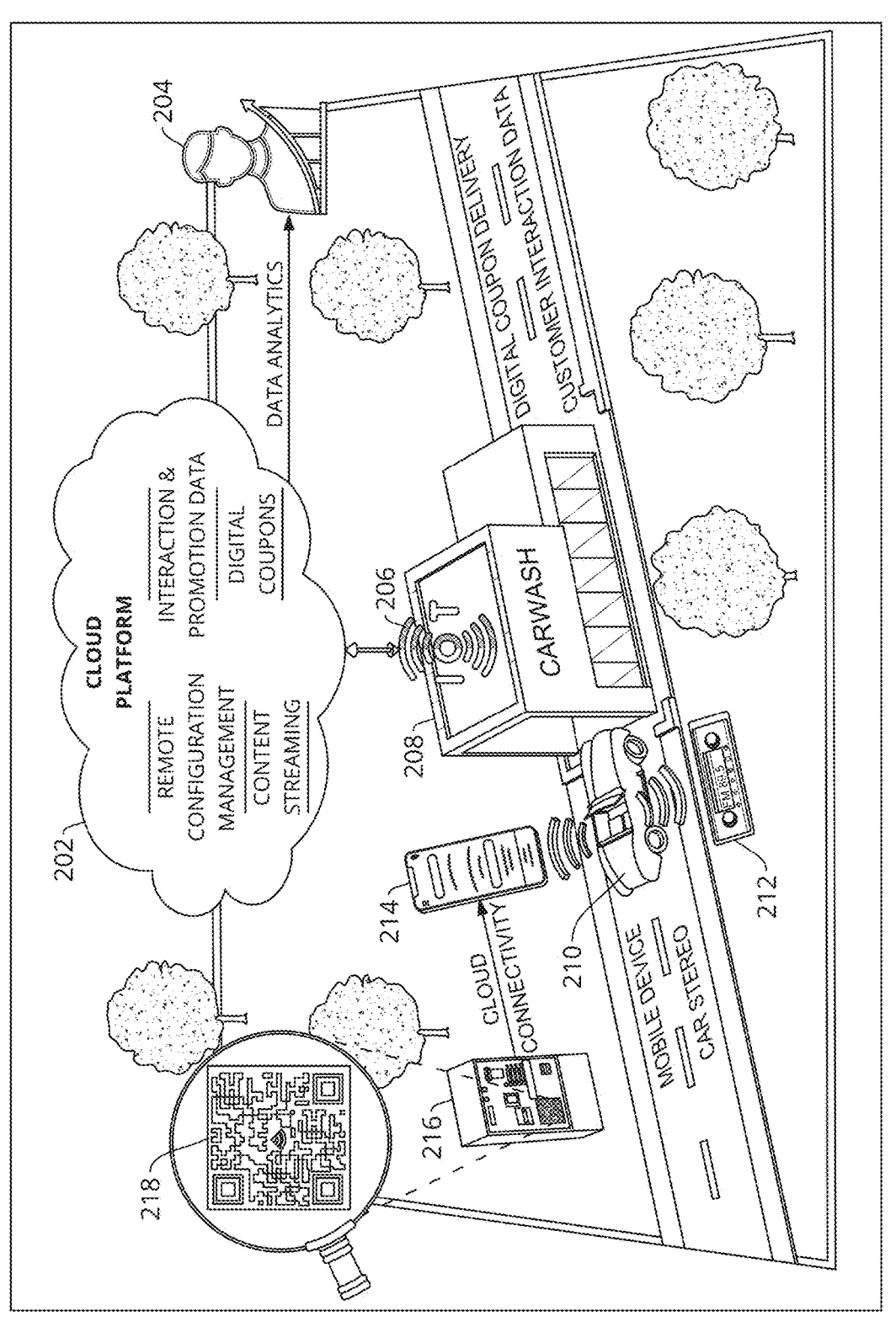
FIG. 2 is a schematic view of an exemplary embodiment of the subject disclosure.

Referring now to FIG. 1, the subject disclosure may include the following systemic components:

A deterministic wash type module 102 having a format decision making module 104 for defining the underlying car wash environment, which may include but is not limited to a tunnel environment 106, in-bay automatics environment 108, and a self-serve environment 110. Some car washes may include two of more of these environments, whereby the system reconfigures its subroutines when transitioning between the environments.

The deterministic wash type module 102 is connected to a computing network. The computing network and/or deterministic wash type module 102 is operatively associated with a user configuration interface and (internet of things) IoT server(s). Through these interfaces, the deterministic wash type module 102 is configured to assign each customer an input signal 112, based on the wash environment defined by the format decision making module 104.

To be clear, the input signal is provided by the customer to the system (e.g., carwash package purchased at the POS), and the input signal becomes the primary key data element. This customer input signal links a subset of digital offer elements (e.g., digital asset, distribution method, date effectiveness, etc.) to that specific input signal, which would be configured by a user (e.g., system administrator). The primary key data element may include a bundle of data sets for selectively culling and identifying which digital asset will be linked to the tunnel environment 106, in-bay automatics environment 108, self-serve environment 110, and other environments via the user configuration interface and IoT server(s).

The modules 102 and 104 determine digital offers 114 (e.g., ad or coupon content), and their distribution module 116, effectivity dates 118 (e.g., when will the promotion start and end), content delivery triggers 120 (e.g., at what point during the wash will content be delivered) and assignment of customer receipt method 122. Digital offers 114 are created using commercial-off-the-shelf (COTS) graphics packages, recording and editing software and/or AI voice generation services (e.g., text-to-voice). Once created, the digital asset(s) are uploaded to the cloud platform and are associated/linked to with the primary key data element determined by customer input signals 112 and through a relational database via a user interface, which is used by the person (e.g., system administrator, key user, etc.) that's creating the in-wash customer experience.

The receipt method 122 facilitates the digital asset delivery determined by the distribution module 116—i.e., how the customer receives their digital asset via the user configuration interface and IoT server(s). In one embodiment, when the customer scans the QR Code a cookie and session ID request is sent to platform through an established TLS/TCIP secure connection, which links the customer's mobile device to platform 202 and through this connection, digital offers are distributed based on the configuration created for that customer input signal An offer receipt method module 124 enables creation of text/SMS message content 126, email content 128, and direct display message content 130 as a function of the digital assets identified and linked to the tunnel 106, in-bay automatics 108, and self-serve 110 environments via the user configuration interface and IoT server(s). The offer receipt method module 124 is configured to facilitate the following functionality: QRC generation 132 (initial at the POS and subsequent QRC generations during the in-vehicle wash experience), which includes placement of QRC label 134 that can be machine read by the customer's mobile device at the pay station or subsequent washing events.

A system request delivery module 138 enables a customer to decide how they want to receive the content (text message or direct display): customer mobile device, carwash program logic controller (PLC), IoT device, router and modem, IoT server(s), or the like, whereby digital content is delivered based on the customer input signal 112, predefined delivery trigger, date effectivity range and per customer's requested delivery mode of the digital assets linked to the tunnel 106, in-bay automatics 108, and self-serve 110 environments.

In one embodiment, the subject disclosure is configured so that once the customer scans the QR Code at the POS after they've purchased their service/wash, an app automatically opens up on their mobile device and prompts them to select*their in-wash experience. Once initiated, another screen is displayed for the customer to decide the mode of how they want to receive their digital offer (i.e., SMS/MMS, email and/or direct display on their device). The person (e.g., system administrator, key user, etc.) configuring the customer's in-wash experience would've set up the washing operation that, when activated, would trigger the distribution of the offer per the customer's decision. For example, if the wash operation trigger was the 'final rinse', when that wash operation is triggered during the customer's in-wash experience, the digital offer will be distributed per the customer's selected mode.

The IoT device may, in one embodiment of the subject disclosure, include a system-on-chip SoC architecture that captures multiple inputs received from electronic relays (customer, wash operation, etc.) and processes numerous outputs (cloud platform signals, external speaker messages, etc.).

Referring to FIG. 1, a method of operation for the subject disclosure may include the following. The operator first configures the software to distribute the digital asset and decides when and how the offer will be displayed. The user determines which service (e.g., wash package) to associate the content with, uploads their created content (e.g., coupon, ad, text message, etc.), determines the date effectivity and selects the wash function for when the offer will be distributed during the wash, thereby allowing the user to selectively decide whether the offer is delivered in the beginning, middle or end of the in-wash experience. All content is automatically associated with a QRC or equivalent readable data transmission system.

In one embodiment, the customer vehicle 210 drives up to the pay station 216 and scans a QRC 21 which brings up a screen on the display of the pay station 216 for the customer to confirm how they want to receive their offer (text message, email, and/or displayed directly on their mobile device).

This QRC 218 scan connects the customer's mobile device 214 with a cloud-based platform 202 that facilitates the delivery of the digital asset.

Having entered the wash facility 208, the customer's digital offer embodied in the digital assets will be distributed when the pre-defined function is triggered and in the way they requested to receive it.

The transaction is stored in the cloud platform 202 to be analyzed and reported on.

The following systemic steps or components represent a decision tree algorithmic process that can take various pathways.

Step #1—If the user selects tunnel 106 or in-bay automatics 108 environments, via the format decision making module 104, the selected wash function will be used to trigger when the digital offer is distributed. However, for the tunnel environment 106, a time-based configuration input is added and will activate the content distribution once the countdown is completed.

In a tunnel environment where the vehicle is constantly moving, there's the potential of having many more wash operation triggers to process in a given customer experience so using a time-based or hybrid method (time and relay-based) to generate the triggers that will serve as the foundation for the in-wash experience would be beneficial (i.e., significantly fewer relays, less interfaces, higher flexibility to change/refine the experience, etc.).

A computer algorithm monitors and extracts the sequence, time occurrence and duration of each wash operation trigger. This information is transformed into a table that is manually or programmatically loaded into the cloud platform's start delay and duration database fields associated with each wash operation, which is then used for the basis of creating the experience. During the monitoring process, if any of these timing values change significantly, a new dataset will be generated and processed as described above. This hybrid method is used for both tunnel and IBA wash formats for triggering digital offer distributions.

Step #2—What wash service or event will digital asset be linked to? When the user selects what service will be associated with a promotion, the system will tie this to the appropriate created digital asset for distribution. Digital offers may be created using commercial-off-the-shelf (COTS) graphics packages, recording and editing software and/or AI voice generation services (e.g., text-to-voice). Once created, the digital asset(s) are uploaded to the cloud platform and are associated/linked to with customer inputs through a relational database via a user interface, which is used by the person (e.g., system administrator, key user, etc.) that's creating the in-wash customer experience.

Step #3—When will the promotion start and end? When the user selects the effective date range, this will enable the digital asset to only be distributed during this period.

Step #4—At what point during the wash will content be delivered? When the user selects the wash event (e.g. the wash function or service) that triggers the distribution of the digital asset, only when that function is activated will the digital asset be distributed, assuming it is in the date effective range.

Step #5—How will the customer receive their digital asset? Once the carwash operator configures how the customers will receive their digital assets (e.g., text message, email, direct display on smart device, all the above, etc.), then the offer will be distributed only by the method(s) selected.

Step #6—Customer decides how they want to receive the content is the digital asset/offer content (text message, email, or direct display): If the customer selects text message, the offer will send to the smart device via text message when triggered. If the customer selects email, their offer will be emailed to them. If the customer selects a direct display, the offer will be displayed on the customer's smart device when triggered. In one embodiment of the subject disclosure, carwash plc triggers are picked up and processed by a hardware service that's located on the IoT device (system-on-chip). Changes in the array are sent to a server via a TLS/TCIP secure connection. At the same time, the hardware service sends device ID and array information to a web page Real Time Service to the cloud that monitors the status of the wash operation trigger and when it gets activated.

Digital offers are distributed via the established cookie/session ID, which links the cloud platform to the customer, and when a change is detected on the wash-operation trigger array, the offer is sent to the customer's phone and via SMS/MMS and/or email if requested. The carwash operator/user assigns the wash operation that will trigger the distribution of the digital offer and when the system detects a change in this array, the offer will be sent consistent with the customer's preferences.

Step #7—When the customer drives up (210) to the pay station (216), they will scan the QRC (218) with their mobile device (214), which will connect with the cloud servers via the IoT (206) that is interconnected with the carwash PLC (208). Through this connection, the customer's inputs are processed in the cloud platform (202) and an offer is distributed accordingly. Customer interaction and promotion information (202) is submitted to a database that can be analyzed and reported against by way of a data analytics module (204). The datal analytics module 204 may include metrics related to revenue generation, customer experience, campaign effectiveness and campaign data capture related to digital offers distributed to customers during their wash. The tabular and graphical representations may be presented through MySQL web server Generally, a method of making the subject disclosure includes building a microprocessor based connected device that interfaces with a carwash PLC to capture output signals from the activation of various carwash functions (e.g., relays, sensors, switch closures, etc.) and which can send these signals to the cloud platform 202. Using common programming language code, the device sends these signals to a cloud environment.

A method of making the subject disclosure may include the following. Develop a web application using a common programming language to process these output signals, upload various digital files assets (coupons, ads, etc.) and house configurable time-based promotions, which can be distributed to carwash customers' smart devices. For this distribution to occur, a QR Code will need to be created for the respective linked and configured promotion using a commercial off-the-shelf integrated standard QR Code generator and digital asset. When scanned by the customer, the customer's smart device will be linked to the created promotion and distributed based on the configured logic.

At a minimal, configurable parameters will need to be created for which carwash signal to distribute the offers on, the wash package to associate the offer with and the promotion effectiveness dates. Promotion configurable parameters include: customer input signal (e.g., wash packaged purchased), promotion code (alpha-numeric), start-end dates for promotion, digital image of coupon, description of discount and any hyperlinks to be included.

For receipt of the promotion, a commercial off-the-shelf (Short Message Service) SMS solution will need to be integrated into the web application to allow offers to be sent to customers via text message. To send offers through email, an email engine will need to be integrated into the web application using the selected email platform or Application Programming Interface (API). For the offers to be displayed directly on the customer's smart device, a graphical user interface on the customer's mobile device will need to be created to facilitate the presentation of this information to the customer.

A transactional reporting database, which may be a MySQL or the like relational database located on a web server, will be integrated into the web application to capture customer behavior and marketing contact information for marketing, advertising, and operational efficiency purposes.

A method of using the subject disclosure may include the following. The device set-up portion includes paring the device that is to be connected to the on-site carwash PLC with the cloud platform. This would include adding the device pairing credentials, naming the device, and delegating any access rights if desired. Generate a digital QRC 218 within the cloud platform 202. This will be the QRC 218 that will be used for the customer to connect to the cloud platform 202 and receive their digital offer.

Digital Asset Creation

Once the mobile device 214 is set up, the next step would be to determine what will be promoted, design the supporting digital asset (e.g., discount coupon, ad, etc.) and save it to a compatible format (e.g., PDF, J PEG, etc.). Determine what wash package to associate the digital asset with and upload to the cloud platform.

Select the wash format type (e.g., tunnel, in-bay automatic, etc.).

Select the trigger for when the digital asset will be distributed during the wash.

Select the choice(s) of how the customer will be able to receive their digital assets (e.g., text message, email, screen display, etc.). Set an effective date for when the promotion will start and end.

Print QR code and apply to a location on pay station that's easily visible and scannable by the customer. The QR code can also be digitally added to the screens of POS systems that have video monitors.

The promotion has now been established in the system and is ready to use.

Customer Interaction and Engagement

When a customer drives up to the pay station 216, they will scan the QRC after payment 218 and be prompted regarding how they would like to receive their offer. At this point, the customer can choose to receive it via email, text message or have it displayed directly on their device screen. If they elect to receive a text message, they will be asked to enter their cell phone number.

Upon entering the wash, the digital asset (coupon, ad, etc.) will be distributed to the customer during the wash process based on the trigger established in the system (e.g., upon entry, at some point during the wash, upon exiting, etc.).

The digital asset distribution, customer contact information, purchase data and other customer interaction data available will be captured by the platform and stored for reporting.

This customer data can then be used in accordance with state and federal laws to target customers via SMS, email, etc. with desired marketing messages to drive conversion, up-sell and increase brand loyalty.

Additionally, the subject disclosure can be used anywhere there's a need for the automated distribution of digital assets based on the triggering of an event during a user experience where the customer can opt-in to receive it.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the subject disclosure may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations, one or more steps of one or more methods described or illustrated herein, where appropriate.

In some embodiments, the computing systems may execute any suitable operating system such as IBM's z-Series/Operating System (z/OS), MS-DOS, PC-DOS, Mac-OS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like.

In some embodiments the computing systems include a processor, a memory, a user interface and a communication interface. In some embodiments the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example, and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In some embodiments the memory is non-volatile, solid-state memory.

The user interface may include hardware, software, or both providing one or more interfaces for communication between a person and the computer systems. As an example, and not by way of limitation, a user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A computer-implemented method for engaging with a computing device of a user of a car wash having a plurality of wash operations, the method comprising:

providing a machine-readable code via a point-of-sale terminal of the car wash, the machine-readable code configured to cause computing devices to transmit a) a respective session ID and b) at least one of i) a respective device identifier or ii) a respective cookie identifier to a remote server upon scanning of the machine-readable code;

receiving, by the remote server and in response to the computing device of the user scanning the machine-readable code, a) a session ID, and b) at least one of i) a device identifier or ii) a cookie identifier associated with the computing device of the user, thereby linking the computing device of the user to the remote server;

receiving, by the remote server, an input signal corresponding to an input from the user, the input signal comprising a subset of wash operations of the plurality of wash operations;

for each wash operation of the subset of wash operations, determining, by the remote server, an associated digital offer element;

sequentially detecting, by a programmable logic controller (PLC) at the car wash, activation of each car wash operation of the subset of wash operations via one or more sensors, electronic relays, and/or switch closures of the car wash;

sequentially transmitting, by the PLC and to the remote server, an indication of activation of each wash operation of the subset of wash operations; and upon receiving each sequentially transmitted indication of activation of each wash operation from the PLC, transmitting in real time, by the remote server and based at least in part on the session ID and one of i) the device identifier or ii) the cookie identifier, the determined associated digital offer element corresponding to the wash operation to the computing device of the user.

2. The method of claim 1, wherein the plurality of wash operations comprise a pre-wash operation, a foam application operation, or a high-pressure water blasting operation.

3. The method of claim 1, wherein the remote server receives the input signal from the point-of-sale terminal.

4. The method of claim 3, wherein the machine-readable code comprises a quick-response code (QRC) at the point-of-sale terminal of the car wash.

5. The method of claim 4, wherein the car wash is an in-vehicle car wash.

6. The method of claim 5, wherein the in-vehicle car wash is unattended.

7. A system for engaging to a computing device of a user of a car wash having a plurality of wash operations, the system comprising:

one or more sensors, electronic relays, and/or switch closures of the car wash;

a programmable logic controller (PLC) at the car wash, the PLC in communication with the one or more sensors, electronic relays, and/or switch closures, the PLC configured to:

sequentially detect activation of each car wash operation of the plurality of wash operations via the one or more sensors, electronic relays, and/or switch closures of the car wash; and sequentially transmit, to a remote server, an indication of activation of each detected wash operation;

a quick-response code (QRC) provided by a point-of-sale terminal at the car wash, the QRC configured to cause computing devices to transmit at least one of i) a respective device identifier or ii) a respective cookie identifier to the remote server upon scanning the QRC; and the remote server, wherein the remote server is in communication with the point-of-sale terminal, the PLC, and the computing device of the user over at least one communication network, the remote server configured to;

receive, in response to the computing device of the user scanning the QRC, at least one of i) a device identifier or ii) a cookie identifier associated with the computing device of the user, thereby linking the computing device of the user to the remote server;

receive an input signal corresponding to an input from the user, the input signal comprising a subset of wash operations of the plurality of wash operations;

determine, for each wash operation of the subset of wash operations, an associated digital offer element;

sequentially receive, from the PLC, an indication of activation of each wash operation of the subset of wash operations; and transmit in real time, upon receiving each sequentially received indication of activation of each wash operation of the subset of wash operations from the PLC and based at least in part on one of i) the device identifier or ii) the cookie identifier associated with the computing device of the user, the determined associated digital offer element corresponding to the wash operation to the computing device of the user.

* * * * *